United States Patent [19]

Lipman

[11] 4,358,820
[45] Nov. 9, 1982

[54] INVERTER WITH INDIVIDUAL COMMUTATION CIRCUIT

[75] Inventor: Kenneth Lipman, West Hartford, Conn.

[73] Assignee: United Technologies Corporation, Hartford, Conn.

[21] Appl. No.: 220,540

[22] Filed: Dec. 29, 1980

[51] Int. Cl.³ .......................................... H02M 7/515
[52] U.S. Cl. .................................... 363/135; 363/138
[58] Field of Search ............... 307/252 M; 363/17, 27, 363/28, 135, 136, 138, 139

[56] References Cited

U.S. PATENT DOCUMENTS

| 3,249,844 | 5/1966 | Jensen . | |
|---|---|---|---|
| 3,805,141 | 4/1974 | Pompa, Jr. et al. . | |
| 3,919,624 | 11/1975 | Tappeiner . | |
| 3,986,098 | 10/1976 | Tamii et al. | 307/64 X |
| 4,172,278 | 10/1979 | Leverich | 363/139 |
| 4,204,268 | 5/1980 | Vivirito | 363/135 |
| 4,225,912 | 9/1980 | Messer | 363/57 |

FOREIGN PATENT DOCUMENTS

| 2039868 | 4/1971 | Fed. Rep. of Germany | 363/135 |
|---|---|---|---|
| 1393311 | 5/1975 | United Kingdom | 363/135 |

Primary Examiner—A. D. Pellinen
Attorney, Agent, or Firm—Richard P. Lange

[57] ABSTRACT

An individual commutation for use with an inverter includes two resonant loops one of which is connected to the main current path adjacent each of the main thyristors. Each resonant loop includes a series coupled commutation capacitor and inductor together with commutation thyristor which is enabled to provide a commutation pulse to extinguish the load current through conducting main thyristor for a sufficient period to allow transition to the nonconducting state.

4 Claims, 1 Drawing Figure

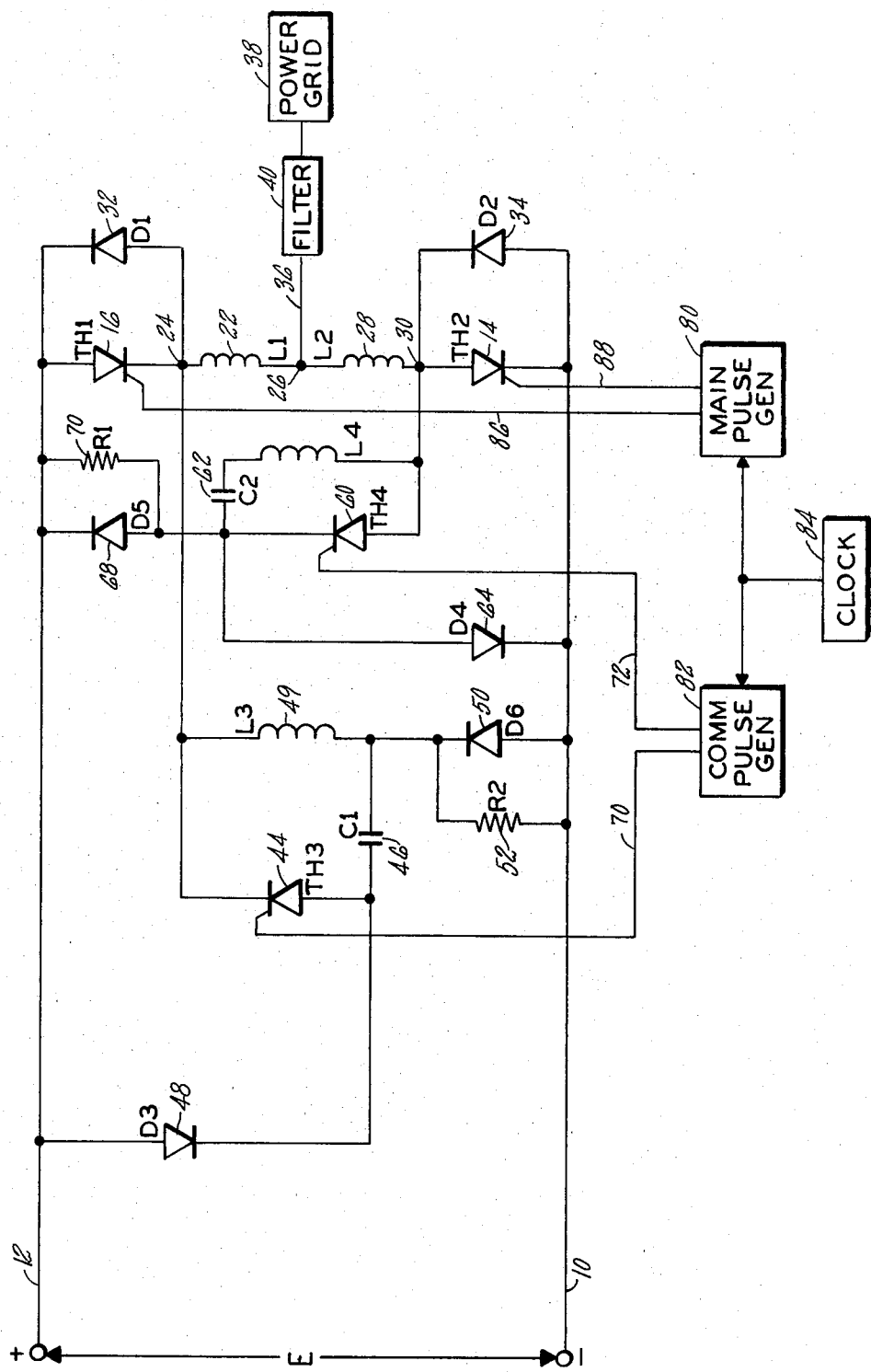

INVERTER WITH INDIVIDUAL COMMUTATION CIRCUIT

TECHNICAL FIELD

This invention relates to inverters and, more particularly, to an inverter with a novel commutation circuit for transitioning the main thyristors to the nonconducting state.

BACKGROUND ART

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of switching elements, and by alternatively actuating each switch, electrical energy from the DC source flows through the load first in one direction and then in the reverse direction forming a fundamental AC waveform.

Numerous different types of switching devices can be employed in an inverter to reverse the current through the load. Semiconductor switches, such as thyristors, are frequently used in present day inverters and this type of device is typically unidirectional so that the high energy current pulses pass therethrough in one direction when turned on by a suitable signal applied to its control terminal. Many thyristors, as is known, will not change from a conducting state to a nonconducting state merely upon the removal of the control signal from the control terminal but require that the instantaneous magnitude of current passing therethrough to be reduced to zero together with a small positive bias before transitioning to the nonconducting state. The process by which the current is redued to zero through the thyristors under load so that transition to the nonconducting state can occur is known as "commutation" and numerous circuit configurations have been proposed for this purpose. Many commutation circuits operate by presenting a commutation pulse to the load from a storage device, such as a capacitor or resonant circuit, for a period of greater than the turn-off time of the thyristor. Since during this period the load current is supplied by the storage device, the instantaneous magnitude of the current through the thyristor drops to zero for a sufficient period to allow transition to the nonconducting state.

Of interest is U.S. Pat. No. 4,204,268 by J. R. Vivirito issued on May 20, 1980 for AUXILIARY COMMUTATION CIRCUIT FOR AN INVERTER, assigned to the same assignee as the present invention. The disclosed apparatus includes an auxiliary commutation circuit of the impulse commutated bridge inverter type in which additional commutation energy is stored on a pair of oppositely charged capacitors. Rather than operate on every cycle, the commutation circuit includes switches in series with the charge capacitors that are operated only in response to a sensed overcurrent condition to provide the additional stored energy required for commutation of the main thyristors.

Another disclosure of interest in U.S. Pat. No. 4,225,912 to G. J. Messer, issued on Sept. 30, 1980 for CONTROL FOR AN AUXILIARY COMMUTATION CIRCUIT, also assigned to the same assignee as the present invention. A control circuit used with an auxiliary commutation circuit of an inverter responds to the increased time period resulting from the additional capacitance of the auxiliary capacitors to extend the initiation of the makeup pulse. This allows a natural decay of the commutation pulse so that the makeup pulse begins when the instantaneous value of the current through the thyristor is low.

DISCLOSURE OF THE INVENTION

It is an object of the present invention to provide an inverter with a novel commutation circuit for transitioning the main thyristors from their conducting to their nonconducting state.

According to a feature of the present invention an individual commutation circuit for use with an inverter charges the commutation capacitors to a higher voltage thereby employing a commutation capacitor of a smaller size.

According to another feature of the present invention a commutation circuit for use with an inverter does not require the commutation pulses to pass though the DC bus so that a special bus design is not required.

According to yet another feature of the present invention a commutation circuit for use with an inverter has a positive and negative portion which are independent so that selective commutation can be used anytime a main thyristor is not carrying current.

According to still another advantage of the present invention, a commutation circuit for use in an inverter is not affected by a drop in the input voltage to the inverter so that there is always sufficient stored energy to commutate the main thyristors to the nonconducting state.

An advantage of the novel individual commutation circuit of the present invention is that no symmetry is required between the positive and negative portions of the commutation circuit so that matched components need not be used in each half of the commutation circuit.

According to still another feature of the individual commutation circuit of the present invention is that there is no recycle delay associated with the actuation of the commutation circuit since the commutation capacitors are at the correct potential after a main thyristor has been turned off.

The foregoing and other objects, features and advantages of the present invention will become more apparent from the following description of preferred embodiments and accompanying drawing.

BRIEF DESCRIPTION OF THE DRAWING

The sole FIGURE is a block diagram of a simple inverter together with one embodiment of the individual commutation circuit according to the present invention.

BEST MODE FOR CARRYING OUT THE INVENTION

Referring to the drawing, one embodiment of the inverter with an individual commutation circuit according to the present invention is seen. A power inverter includes a negative bus 10 and a positive bus 12, both of which receive DC from an external DC source (not shown), such as a fuel cell or the like. While the drawing depicts a single half-bridge inverter configuration connected across the negative and positive buses, it should be understood that any number of half-bridges could be used, and multiphase AC electrical output power can be formed from a plurality of properly phased half-bridges. A pair of main semiconductor switches, such as a thyristor 14 and a thyristor 16, are provided and are connected in an anode-to-cathode orientation across the two buses. An inductor 22 is connected to a node 24 and on to the cathode side of the thyristor 16. The other end of the inductor 22 is connected to an output node 26. In a similar fashion, an inductor 28 is connected to a node 30 and on to the anode side of the thyristor 14. The other end of the inductor 28 is connected to the output node 26. A diode 32 has its anode connected to the node 24 and its cathode connected to the positive bus 12 for shunting the main thyristor 16. A diode 34 has its cathode connected to the node 30 while its anode is connected to the negative bus 10 for shunting the main thyristor 14. An output bus 36 is connected to the output node 26 and provides an output pathway out of the inverter for current from the DC source to a load such as a power grid 38. A filter 40 is normally provided in the current path from the inverter and may include such items as transformers, or the like, which also change the magnitudes of the voltage-current waveforms of the output electrical energy.

As mentioned briefly herebefore, a particular feature of the present invention relates to the novel commutation circuit. This circuit comprises two halves which have basically the same component parts. A commutation thyristor 44 is the switching element that is used to activate the commutation circuit if the thyristor 16 is to be gated off, and it has a cathode connected to the node 24. The anode end of the thyristor 44 is connected to one side of a capacitor 46 and also to the cathode of a diode 48. The anode of the diode 48 is connected to the positive input bus 12. The other side of the capacitor 46 is connected to one end of an inductor 49 and the cathode of the diode 50. The other side of the inductor 49 is connected to the node 24. The diode 50 has its anode connected to the negative bus 10. A resistor 52 is connected from the cathode of the diode 50 to the negative bus 10 to shunt the diode 50.

The other half of the commutation circuit will now be described. A thyristor 60 is provided and is switched on to commutate the thyristor 14 to its nonconducting state. The thyristor 60 has its cathode connected to the node 30, and its anode connected to one side of a capacitor 62 and also to the anode of a diode 64. The other side of the diode 64 is connected to the negative input bus 10. An inductor L4 is connected from the other side of the capacitor 62 to the node 30. A diode 68 has its side connected to the cathode of the thyristor 60 and its cathode is connected to the positive bus 12. A thyristor 70 is connected from the anode side of the diode 68 to the positive bus 12 and shunts the diode 68.

The control pulses which activate all of the thyristors of the present invention would typically be provided by a complex control system which senses voltage and current waveforms at numerous points in the inverter. However, for the purposes of simplicity and a clear understanding of the operation of the individual commutation circuit, a main pulse generator 80 and a commutation pulse generator 82 are shown with this embodiment for creating the control pulses in accordance with a desired switching pattern. A clock 84 provides a timing signal to the main pulse generator 80 and the commutation pulse generator 82 so that a synchronous relationship is maintained between the pulses generated by the respective generators. The main pulse generator 80 is connected to the control terminal of the main thyristor 16 by a line 86 and to the control terminal of the main thyristor 14 by a line 88. In a similar manner, the commutation pulse generator 82 is connected to the control terminal of the thyristor 44 by a line 70 and is also connected to the control terminal of the thyristor 60 by a line 72.

The operation of the individual commutation circuit according to the present invention can probably be best understood by a description of one cycle of operation. With the inverter in its off state the voltage across the capacitors 46 and 62 stabilizes at approximately one-half of the input voltage presented across the negative bus 10 and the positive bus 12 from the source, this being E/2. A control pulse from the main pulse generator 80 gates the thyristor 16 to its on state that connects the positive bus 12 to the output node 26 and a positive current begins to flow through the output bus 36 to the power grid 38. At the same time, the DC source voltage E/2 appears across the diode 50. The voltage across the thyristor 44 continues at one-half of the source voltage as does the voltage across the capacitor 46. The voltage across the diode 48 goes from zero to −E/2. A current flows through the path consisting of the thyristor 16, the inductor 22, the inductor 28, the inductor L4, the capacitor 62 and the diode 64. This current continues until the voltage across the capacitor 62 equals the DC source voltage E. At this point, the diode 68 begins conduction preventing any further increase in the voltage level across the capacitor 62. After a short period of time, i.e., a few hundred microseconds, the current in the just aforementioned path drops to zero as the quiescent state is reached.

There will now be described a commutation of the thyristor 16 which occurs when the connection between the positive bus 12 and the output bus 36 is to be disconnected in accordance with the switching pattern. First, the control pulse from the main pulse generator on the line 86 changes to its low state and a gate pulse is provided by the commutation pulse generator 82 on the line 70 to the control terminal of the thyristor 44. This gates the thyristor 44 to the on state and a current pulse flows through the thyristor 44 and the resonant circuit comprised of capacitor 46 and inductor 49. At the end of a half cycle, the voltage across the capacitor 46 has been rung up to the opposite polarity and has a voltage level of slightly less than E/2. The commutation current now begins to flow through the path formed by the diode 48, the capacitor 46, the inductor 49, and the parallel combination of the thyristor 16 and the diode 32. As the magnitude of this current pulse signals the load current, if any, flowing through the anode-to-cathode path of thyristor 16, the thyristor 16 changes to its non-conducting state.

Next, in response to a pulse from the main pulse generator 80, the thyristor 14 is gated to its conducting state connecting the negative bus 10 to the output node 26 and the output bus 36. If the capacitor 46 has less than bus voltage across it, it is charged by way of a short current pulse through the inductor 22, node 24, inductor 49 until its voltage level rises to the point where it is clamped by the diode 50. At this time, the capacitor 62 is fully charged and the thyristor 60 is not conducting so that the diode 64 is reversed bias to the voltage on the negative bus 10. Accordingly, the capacitor 62 is now fully charged to provide a commutation pulse, if required, for the next switch point.

At the next switch point, the thyristor 14 is to be switched to its nonconducting state. This transition, whether or not a commutation pulse is required, will be similar to the just-described commutation of the thyristor 16.

Although this invention has been shown and described with respect to a preferred embodiment, it will be understood by those skilled in this art that various changes in form and detail thereof may be made without departing from the spirit and scope of the claimed invention.

I claim:

1. An inverter for receiving electrical energy from a DC source and transforming it to alternating electrical energy at an output bus, comprising:

main switch means for alternatively connecting one of a pair of input buses to said output bus, said main switch means being translatable to the nonconducting state only when there is no load current therethrough;

commutation means including a switch means connected in a resonant loop in series with a commutation capacitor and with an inductor, and further including a diode means connected to said resonant loop to clamp said commutation capacitor to the voltage potential of one of said pair of buses; and whereby when said switch means in said series resonant loop is rendered conductive, said commutation capacitor discharges into said load for a sufficient period of time to allow said main thyristor which is conducting to switch to the off state.

2. An inverter according to claim 1, wherein said pair of input buses is a positive bus and a negative bus which can be connected to said DC source, and wherein said main switch means includes at least two thyristors, one of which is connected between said positive bus and said output bus, and the other of which is connected between said negative bus and said output bus.

3. An inverter according to claim 2, wherein there are two resonant loops, one of which is connected to the main current flow path between one of said thyristors and said output bus, and wherein the other of said resonant loops is connected between the other of said thyristors and said output bus.

4. An inverter according to claim 1, further including a pair of diodes connected to said commutation capacitor in said resonant loop, each one of which is also connected to one of said pair of input buses.

* * * * *

UNITED STATES PATENT AND TRADEMARK OFFICE
CERTIFICATE OF CORRECTION

PATENT NO. : 4,358,820

DATED : November 9, 1982

INVENTOR(S) : KENNETH LIPMAN

It is certified that error appears in the above-identified patent and that said Letters Patent is hereby corrected as shown below:

Column 1, line 36, "redued" should be -- reduced --

Column 3, line 50, "thyristor" should be -- resistor --

Column 4, line 50, "signals" should be -- equals --

Signed and Sealed this

Thirteenth Day of September 1983

[SEAL]

Attest:

GERALD J. MOSSINGHOFF

Attesting Officer

Commissioner of Patents and Trademarks